June 23, 1936.  R. D. SMITH  2,045,109
VEHICLE SUPPORTING AND CHECKING APPARATUS
Original Filed April 10, 1935   2 Sheets-Sheet 1
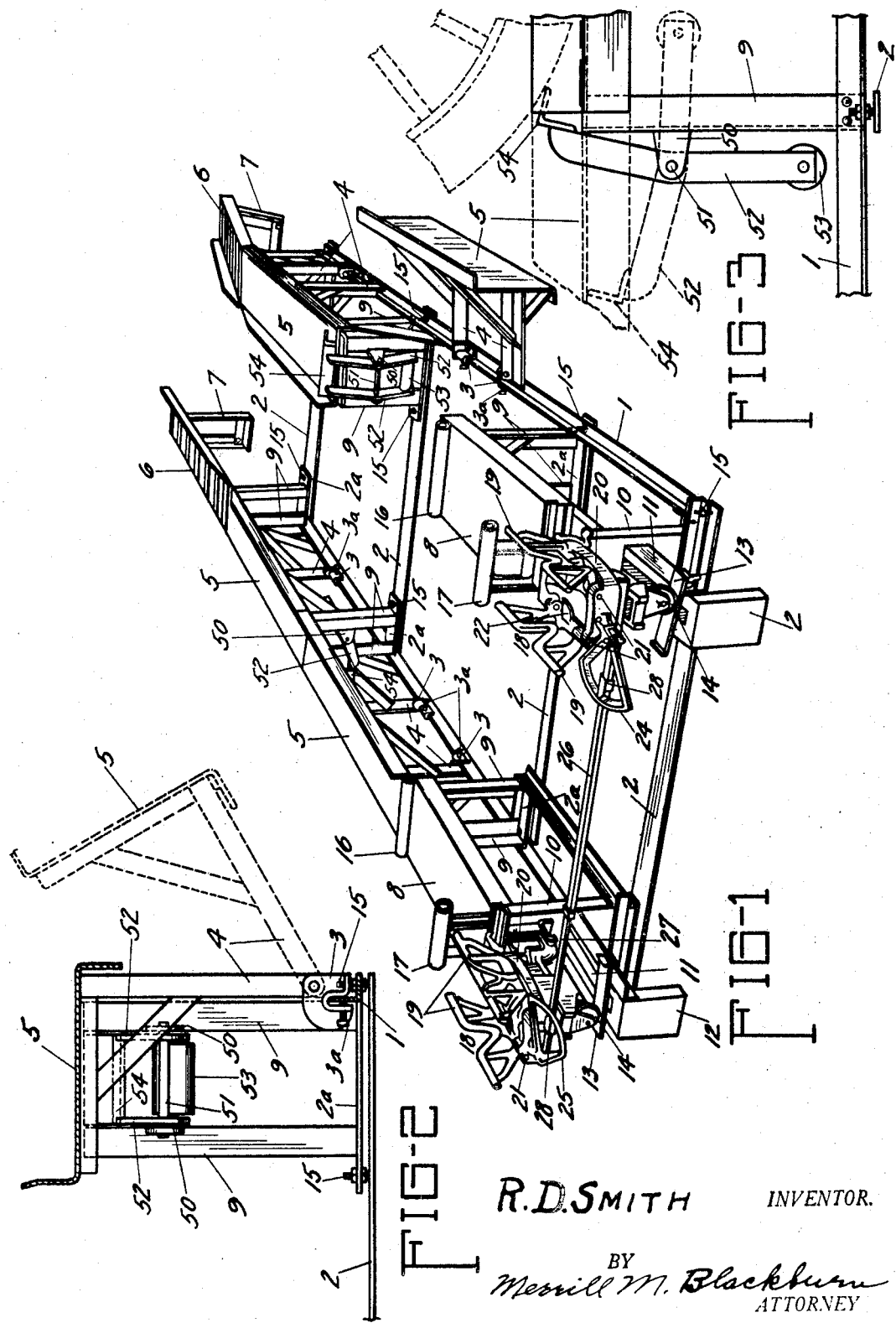
R.D.SMITH  INVENTOR.
BY Merrill M. Blackburn
ATTORNEY June 23, 1936.   R. D. SMITH   2,045,109
VEHICLE SUPPORTING AND CHECKING APPARATUS
Original Filed April 10, 1935   2 Sheets-Sheet 2
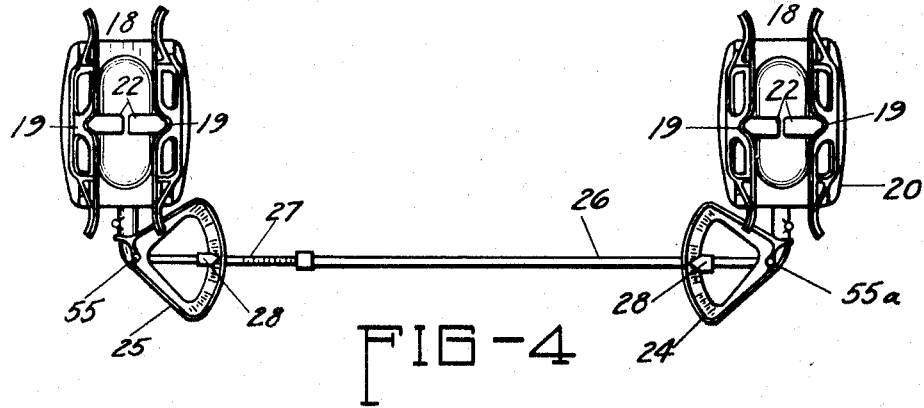
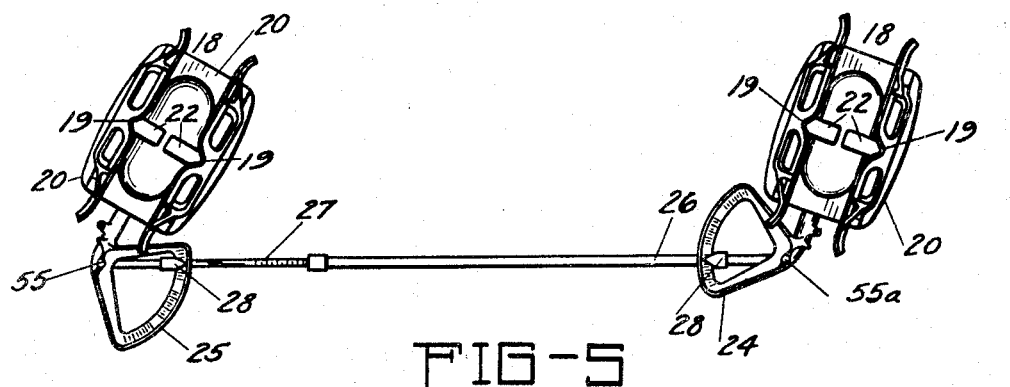
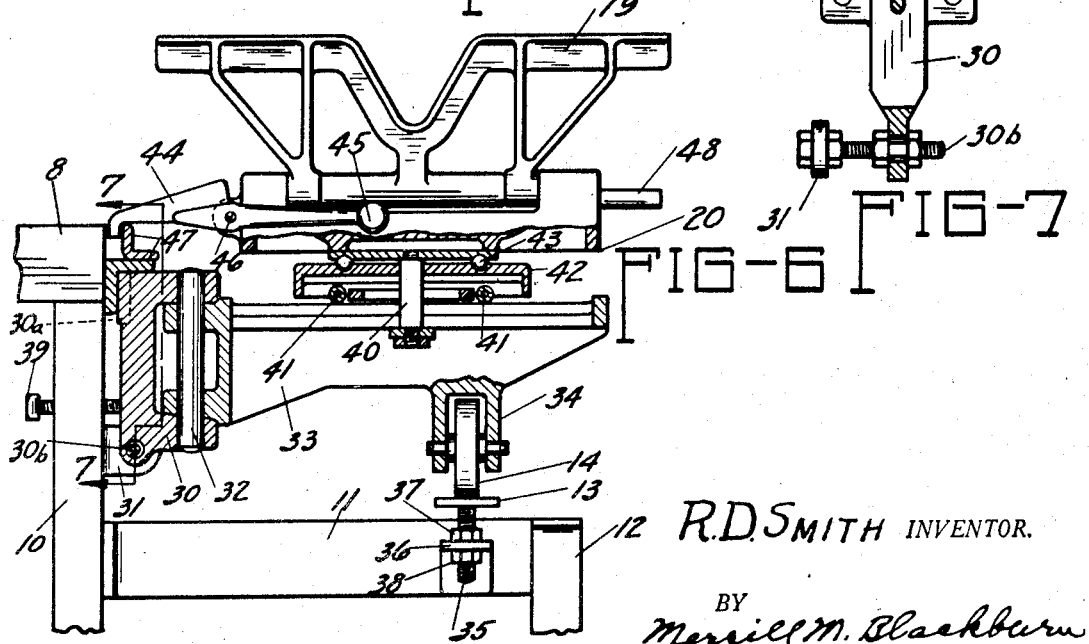
R. D. SMITH INVENTOR.
BY Merrill M. Blackburn
ATTORNEY Patented June 23, 1936

2,045,109

UNITED STATES PATENT OFFICE 2,045,109

VEHICLE SUPPORTING AND CHECKING APPARATUS

Roy D. Smith, Davenport, Iowa, assignor to Bee Line Manufacturing Company, Scott County, Iowa, a corporation of Iowa Original application April 10, 1935, Serial No. 15,526. Divided and this application December 14, 1935, Serial No. 54,446

7 Claims. (Cl. 33—203)

The present invention relates to apparatus for the supporting of motor vehicles at an elevation above the floor or the ground and for the checking of the turning alignment of the vehicle. Among the objects of this invention are the provision of an improved apparatus for supporting a motor vehicle in position to be operated upon; to provide an improved apparatus for checking the turning alignment of motor vehicle; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 is a perspective view of my new machine with a portion of the runway let down to permit ready access to the interior of the support, beneath the vehicle;

Fig. 2 is a transverse section through one side of the machine, showing in dotted lines a part of the runway being let down to the position shown in Fig. 1;

Fig. 3 is a fragmentary elevation intended to show the use of a stop for limiting the motion of a vehicle when a section of a runway is lowered to the position shown in Fig. 1;

Fig. 4 is a plan view of the checking apparatus in neutral or zero position;

Fig. 5 is a view similar to Fig. 4 but showing the parts in the positions occupied when the wheels are turned to the right;

Fig. 6 illustrates a vertical longitudinal section of the means for supporting one of the front wheels of a motor vehicle;

Fig. 7 represents a section taken substantially along the plane indicated by the line 7—7, Fig. 6.

When operating upon the chassis of motor vehicles, it is desirable to have such vehicles supported above the floor so that it will be possible to easily get under the vehicle and get at the under side thereof. It is also desirable to have space under the vehicle to receive apparatus for working upon the vehicle frame. It is also desirable to have means for checking the turning alignment of the front wheels of the vehicle. My present invention comprises apparatus for accomplishing these various desirable ends, and this apparatus will now be described in connection with the appended drawings.

The vehicle support of my present invention comprises a frame, runways supported thereon for the reception of a vehicle, and inclined approaches by means of which the vehicle may get up on the support. The supporting frame is fabricated from various bars and angles appropriately secured together, preferably by electric welding and bolts, although other means of securing the parts together may be adopted if deemed desirable. The longitudinal supporting rails 1 are fastened together by the cross bars 2. Ears 3 are adjustably clamped, by means of set screws 3a, to the rails 1, and to these are pivotally connected the posts 4 upon which are rigidly mounted the sections 5 of the runways upon which the vehicle stands when being operated upon. The ends of the runways are capable of being let down to inclined position, as shown at the right side of Fig. 1, and of being raised to horizontal position, as shown at the left side of this figure. These sections or ramps may be supported in elevated position by supports 7. The forward sections 8 of the runways are supported on posts 9 and plates 10. Projecting forwardly from the plates 10 are bars 11 supported at their forward ends by short posts 12. Secured across the tops of the bars 11 are short tracks 13 upon which the wheels 14 may roll.

Each rail 1 may be made in a plurality of sections provided with ears through which pass bolts to secure the sections together in end-to-end relation. However, it is now thought preferable to make these rails 1 of continuous pieces of angle iron to which the cross ties 2 are bolted. Legs 9 are secured together in pairs and then secured to the rails 1 and cross ties 2a, being thus held in upright position to assist in supporting the runways. The rear end of each runway section 8 is supported by one of these pairs of legs and, as previously indicated, is rigidly connected at its forward end to a plate 10, thus forming a rigid support for a front wheel of the vehicle. Bolts 15, fastened to the cross ties 2, have nuts thereon both above and below the angle irons 1 and supports 2a for the legs 9. This, therefore, makes it possible to level up the runways by moving the nuts up and down on the bolts until the desired adjustment is reached. At the rear end of each section 8 is rigidly secured an obstruction 16, preferably in the form of a section of pipe. This is to prevent the vehicle from accidentally rolling backward when a section of the runway is turned down, as shown by Fig. 1. The respective ends of the sections 5 of the runway are supported by the frames comprising the legs 9 and their connections, and also by the legs 4.

Removable stop members 17 are secured at the forward end of the runway sections 8 to prevent the vehicle from running forwardly farther than desired. If it is desired to run the forward wheels beyond the runways and upon the turning alignment gauge elements 18, it is necessary to remove the stops 17, which will permit the vehicle to easily run forward into position upon these elements 18. Each of these elements comprises, among other parts, a pair of clamping arms 19 pivotally connected to a plate 20, as shown at 21. These clamping members 19 are provided with inwardly projecting arms 22 which nearly meet at the center of the plate 20 when the clamping members 19 are turned inwardly to grip the tires of the vehicle. It will be seen from the foregoing that when the wheels rest on the arms 22 the tire-gripping members 19 will tightly clamp the tires and cause the plates 20 to assume a definite position with relation to the wheels.

Sectors 24 and 25 are rigidly connected to the plates 20, a tube 26 being pivotally connected to the center of one sector and a rod 27 to the center of the other sector, the rod being slidable in the tube as the plates 20 are turned different degrees. An index 28 cooperates with each sector and, from the readings of the two, the relative amount of turn of the wheels about their king pins can be determined.

It is a well known fact that the front wheels of a motor car are normally not parallel to each other but are set with a certain angle with reference to each other, which is referred to as toe-in. It is also a self-evident fact that when the wheels are turned to steer the vehicle to the right or left, the wheel upon the inside of the curve must turn upon a shorter radius of curvature than the other. It is apparent that the centers of curvature should be coincident or else one above the other in a line joining the points of intersection of the axes of the front wheel spindles with the vertical plane passing longitudinally through the axis of the rear wheels. It is also evident that when the front wheels are turned a smaller amount the center of curvature will be farther away from the vehicle than when the wheels are turned to a greater degree. Also, the distance of the center of curvature from the longitudinal axis of the vehicle, for any degree of turning, will vary with the wheel base of the car, the tread thereof, and the king pin inclination. In checking the correctness of the positions of the front wheels, it is therefore important to know these three factors.

In the description immediately following, reference will be made more particularly to Fig. 6. From this it will be seen that a bracket 30 is mounted upon the forward face of the upright 10 at the forward end of each of the runways. Bolts pass loosely through ears 30a at the upper corners of the brackets 30 which may therefore swing in a plane parallel to the face of the upright 10. An ear 31 projects from the upright 10 into proximity to a lower corner of the bracket 30 and has a bolt 30b secured therein. This bolt passes through the lower part of the bracket 30 and the two are secured against relative motion parallel to the upright 10 by nuts on the bolt, upon opposite sides of the bracket 30. Adjustment of these nuts along the bolt will turn the bracket 30 in a direction transverse to the length of the machine, which may be utilized in leveling the plate or turntable 20 in this direction. A pivot pin 32 is mounted in arms of the bracket 30 and on this is pivotally mounted a swinging bracket 33 provided with ears 34 between which is mounted the roller or wheel 14, mentioned above. A pair of screw-threaded members 35 extend downwardly from the plate 13, passing through brackets 36 upon opposite sides of the supporting arms 11. Nuts 37 and 38, above and below the brackets 36, make it possible to adjust the plate or track 13 vertically as needed. When it is desired to level turntable 20 so that it may rotate in a horizontal direction, the nuts on the bolt 30b are moved until they move the bracket 30 the required amount so that the table is level transversely of the machine, and they are tightened to hold it in this position. Now the bolt 39 may be moved to level the turntable in a direction longitudinally of the machine. However, if the forward end of the bracket 33 needs to be lowered, then the nuts 37 and 38 must be moved to accomplish this. Bolt 39 is now tightened until the turntable is kept from sagging. The track 13 may be leveled up by means of the nuts 37 and 38 so that the wheel 14 will rest upon it as the bracket 33 swings about the pivot pin 32.

The bracket 33 is a two-armed bracket and between these arms extends the bolt 40 connected to the underside of the plate or turntable 20. Rollers 41, resting on these arms, support a carrier 42, between which and the turntable 20 are the balls 43, forming a ball bearing for the turntable. A latch member 44 is provided with a crank arm 45 and is pivoted at 46 between ears carried by the turntable 20. A latch bar 47 is mounted at the end of the runway and is engageable by latch member 44 to prevent undesired longitudinal movement of the turntable 20 and support 42. After the vehicle wheels have been mounted between the clamps 19 on the turntable 20, the latches 44 may be released to permit longitudinal motion of the turntables 20 which necessarily occurs when the wheels are turned to either the right or the left in the act of steering. Rotation of the turntables 20 is facilitated by the balls 43. It is evident from the drawings that the sectors 24 and 25 are carried by the arms 48 projecting from plate 20.

When the vehicle wheels leave the runways and enter upon the turntables, if the latter are not properly spaced for the spacing of the wheels, then the brackets 33 will swing about the pivot pins 32 so that the space between the centers of the turntables will be increased or decreased according to that required by the vehicle. The brackets, turntables, and front end of the vehicle are supported primarily by the tracks 13. The brackets 33 constitute bases for the platforms 42 upon which the turntables 20 are rotatable.

As shown in Figs. 4 and 5, the pivot 55, to which rod 27 is connected, and the pivot 55a, to which the tube 26 is connected, are offset laterally toward each other from the axes of the arms 48. It is apparent that when the front wheels of a vehicle are mounted in the units 18 and these wheels are turned as in the act of steering, the pivots 55 and 55a will swing in arcs whose centers are the pivots 40, except that one unit 18 will be carried forwardly by one of the spindles while the other unit 18 is carried backwardly. It is also apparent that the composite unit 26, 27, connecting the pivots 55 and 55a, will move longitudinally but with slight lateral motion. When the pivot 55a starts to move toward the position shown in Fig. 5, from that shown in Fig. 4, its apparent tendency is to move toward the vehicle. Also, the tendency of the pivot 55, when starting to move from the position shown in Fig. 4 toward that shown in Fig. 5, is to move forward slightly and then reverse and move backward toward the vehicle. Since the wheel on the inside of the turn has a shorter radius of curvature and turns farther, when making a turn, than the other wheel, it is apparent that this wheel must turn faster about its king pin than the other wheel. When turning in the direction shown in Fig. 5, the pivot 55a starts from the position shown in Fig. 4 and gradually approaches the vehicle axle while the pivot 55 moves in the opposite direction for a short time and then reverses and moves toward the vehicle axle, finally passing 55a and being closer to the axle. Therefore, the tendency is for the axis of the composite bar 26, 27 to make an angle first in one direction and then in the other with respect to the axis of the vehicle axle. In this way, the axle and the composite bar are kept as nearly parallel as possible, which is a desirable condition. The deviation from parallelism of the two becomes zero when the wheels have been turned through the angle previously decided upon for the gauging operation. At the present time, the angle of turn selected is twenty degrees (20°). The left hand wheel, when turning to the right, is therefore turned through this angle, and the angle of turn of the other wheel is from twenty-two degrees (22°) to twenty-seven degrees (27°), depending on the length of wheel base and other factors.

It is apparent that, unless the king pins are in the central planes of the wheels, the outer wheel will move forwardly and the inner wheel rearwardly with relation to the axle, when making a turn. Obviously, this increases the wheel base on the outer side of the turn and decreases that on the inner side. The shorter the wheel base, the less should be the turning angle of the wheel for accomplishing a given turning movement in a given distance. The readings of the scales of the sectors 24 and 25 give the difference in the amount of rotation of the two wheels about their respective king pins.

There are various positions for the king pin. For example, it may either be in the central plane of the wheel or inwardly from that plane. Up to the present time, there has been no attempt to place the king pin outside of said plane. Also, the king pin may be given more or less or no king pin inclination. The effect of toe-in, camber, caster, king pin inclination, and location of king pin on the geometry of the automobile front end belongs to the realm of texts upon that subject-matter and it is not thought necessary to discuss same further herein. It is sufficient to state that the present construction gives accurate readings, even with variations in these factors.

Ears 50 extend forwardly from a pair of legs 9 and are connected by a pivot member 51 upon which is pivotally mounted a pair of arms 52 connected at their lower ends by a weight 53. These arms extend upwardly above the pivot 51 and are connected at their upper ends by an angle member 54 which serves as a vehicle stop when the runway section 5 is turned down, as in Fig. 1. When it is desired to turn the runway sections up into positions as indicated in Fig. 2, the stop must be turned into the dotted line position shown in Fig. 3.

As is obvious from an inspection of Fig. 1, it is easy, with a section of runway turned down, to pass through the space between section 8 and the other section of runway 5 into the space under the vehicle and between the runways. If desired, a section of the other runway may be turned down, also, making it possible to have access to this space from either side of the vehicle.

This is a division of my co-pending application, Serial No. 15,526, filed April 10, 1935.

It will of course be understood that the specific description of structure set forth above may be departed from without departing from the spirit of my invention as set forth in this specification and the appended claims.

Having now described my invention, I claim:

1. A gauge for the purpose indicated comprising a pair of spaced bases, a platform supported by each base and capable of translation with relation thereto, a turntable supported by each platform for supporting motor vehicle wheels and for rotation in a substantially horizontal plane, a sector connected to each turntable, laterally rigid means connecting the sectors, and indicating means cooperating with the sectors to indicate the amount of turning of the sectors with relation to the rigid means.

2. A structure as defined by claim 1 in which the laterally rigid means is longitudinally extensible and is provided with means for indicating changes in the length of the rigid means.

3. A structure as defined by claim 1 in which the bases are pivotally supported to swing laterally so as to enable the centers of rotation of the turntables to approach or recede from each other in accordance with the width of tread of a vehicle supported thereby.

4. A gauge for the purpose indicated comprising a pair of spaced bases, a platform supported by each base and capable of translation with relation thereto, a turntable supported by each platform for supporting motor vehicle wheels and for rotation in a substantially horizontal plane, a sector connected to each turntable, and laterally rigid means connecting the sectors, the end portions of the laterally rigid means being pivotally connected to the sectors substantially at their geometrical centers, and the said centers being offset inwardly from the central planes of the supported wheels.

5. A gauge for the purpose indicated comprising a pair of spaced bases, a platform supported by each base and capable of translation with relation thereto, a turntable supported by each platform for supporting motor vehicle wheels and for rotation in a substantially horizontal plane, a sector connected to each turntable, laterally rigid means connecting the sectors, the end portions of the laterally rigid means being pivotally connected to the sectors substantially at their geometrical centers, and the said centers being offset inwardly from the central planes of the supported wheels, and indicating means cooperating with the sectors to indicate the amount of turning of the sectors with relation to the rigid means.

6. In a structure for the purpose indicated, a pair of elevated runways for the receipt and support of a motor vehicle, said runways having connected thereto at their forward portions arms which are pivotally mounted to swing in a substantially horizontal direction, said arms being capable of swinging independently of each other, and tables rotatably carried by said arms, said tables being capable of independent rotation about axes carried by said arms.

7. A structure as defined by claim 6 in which each of the tables has a pair of pivotally mounted tire-gripping arms provided with crank arms positioned in the path of vehicle tires entering upon the tables, said crank arms causing the tire-gripping arms to turn inwardly and grip the tires when the latter rest upon the crank arms.

ROY D. SMITH.